United States Patent Office 2,797,152
Patented June 25, 1957

2,797,152
GASOLINE ANTIOXIDANTS

Everett C. Hughes, Shaker Heights, and Samuel M. Darling, Lyndhurst, Ohio, assignors to The Standard Oil Company, Cleveland, Ohio, a corporation of Ohio No Drawing. Application March 29, 1954,
Serial No. 419,564

10 Claims. (Cl. 44—69)

This invention relates to novel chemical compounds, more particularly to N-alkyleneoxyalkyl aminophenols, and to fuels derived from petroleum comprising such compounds.

With the advent of so-called antiknock gasoline, the problems of gasoline stability as to color, gum content and knock rating have become of great importance. Some cracked and straight run gasolines of high quality which are satisfactory for use at the time they are blended deteriorate in storage so that they become darker in color, higher in gum content and of lessened knock rating. Loss of antiknock rating seriously lessens the market value of the gasoline, while gum is likely to deposit in the induction system of the motor.

Induction system deposits may be the cause of serious operational difficulties, for the accumulation of deposits in the fuel-air induction passageway diminishes its size and therefore the maximum air flow which the passage is capable of delivering to the engine. The effect of such deposits on engine performance are, therefore, manifested whenever the engine is operated at or near full throttle as a reduction in power output due directly to the reduction in air flow. In addition, if the engine is equipped with a gear-driven supercharger, deposits may form on the diffuser plate and impeller, overloading the impeller spacer and possibly resulting in mechanical failure of the supercharger.

Drastic chemical treatment will stabilize cracked gasoline, but it is costly because of the losses it entails, particularly in gasolines of high knock rating, and because it is accompanied by destruction or degrading of components having valuable antiknock properties. Chemical treatment is, therefore, undesirable and has in the past been minimized or avoided altogether.

Instead, the art has turned to the addition of antioxidants to the gasoline in an attempt to solve the problem. The most important of the many factors which influence the rate of deterioration is oxygen. Gasoline out of contact with air changes very slowly. Consequently, the theory has been advanced that gum formation is primarily due to the autooxidation of olefinic hydrocarbons which induces formation of chain-propagating free radicals. These in turn engage in polymerization and condensation reactions in the system. Since cracked gasolines normally contain from 10 to 60% olefins, the possibilities for polymerization are quite large and the amount of gum which ultimately may be formed quite high. The autooxidation of olefinic hydrocarbons, particularly conjugated diolefins, is usually accompanied by the formation of polymeric peroxides. These are thought to constitute a large portion of the "potential" gum in aged gasoline and are readily decomposed at the higher temperatures of the engine to form adherent deposits.

Gasoline antioxidants are generally believed to retard oxidation by reacting with the chain-propagating free radicals, generating free radicals which are incapable of initiating chain reactions but are instead converted into relatively stable compounds. Thus, formation of gum becomes impossible or, in any event, considerably retarded by a reduction in the number of chain-propagating free radicals.

A large number of compounds have been proposed for use as anti-oxidants for gasoline, particularly phenols, aminophenols and phenylenediamines. A number of these compounds are available and in commercial use. However, it has been reported in the literature that available inhibitors, while they may be effective in reducing gum formation due to components in the gasoline, themselves give rise to induction system deposits. W. J. Sweeney, J. F. Kunc, Jr. and W. E. Morris, in a paper presented at the annual meeting of the Society of Automotive Engineers at Detroit, Michigan, January 7 to 11, 1946, point out that a relationship exists between the inhibitor content of a fuel and the quantity of deposit laid down in the fuel induction system. Furthermore, the type and condition of the inhibitor used definitely influence induction system deposition. These workers tested three different types of commercial inhibitors and concluded that oxidized and degraded inhibitors produce particularly serious induction system deposits.

In an article entitled "Cutting Aircraft Maintenance Cost" appearing in ASTM Bulletin No. 148, dated October 1947, at page 79, it is pointed out that of the induction system deposits analyzed therein 40% was thought to be due to gum, inhibitor and the products of inhibitor oxidation.

It is obvious that the utility of an inhibitor which is effective in reducing oxidation of olefinic hydrocarbons in the gasoline may be quite outweighed if the inhibitor itself gives rise to significant induction system deposits.

Accordingly, it is an object of the present invention to provide an inhibitor for use in gasolines which inhibits the formation of insoluble gums and resins and the deposition of such materials in the induction system of internal combustion engines.

In accordance with this invention, these objects are achieved through use of N-alkyleneoxyalkyl aminophenols. These compounds are incorporated in fuels derived from petroleum and are effective therein, not only to inhibit the formation of gum, but also to prevent formation of deposits in the induction system of internal combustion engines. Fuels comprising the compounds of the invention are, therefore, characterized by improved stability and a lower apparent gum content due to a reduction in the amount of gum deposited during use.

These compounds are to be distinguished from the N-substituted aminophenols heretofore known as gasoline antioxidants, from which they differ in the presence of one or more ether linkages in the N-substituted side chain. To this difference in structure is attributed the improved potency of the compounds of the invention as antioxidants and gum deposition inhibitors, compared to other N-substituted aminophenols. They are also to be distinguished from alkoxy aryl compounds containing amino or hydroxyl groups, such as anisole, phenetole and methoxy and ethoxy aniline, which possess little or no antioxidant properties.

THE COMPOUNDS OF THE INVENTION

These compounds have the following general formula:

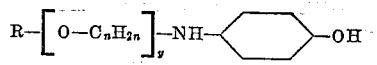

where R is an alkyl radical, $n$ is a small whole number from one to about three, $y$ is a small whole number from one to about five, and N and OH are directly attached to different carbon atoms of the benzene ring. The $C_nH_{2n}$ chain may be straight or branched.

The ether structure is very important to the inhibitory activity of these compounds. Also, if a hydrogen atom is not attached to the nitrogen atom, their activity is reduced. The OH group is also essential, and must be in the para position.

R may be any alkyl group having from one to about ten and preferably one to four carbon atoms arranged in a straight or branched chain, such as methyl, ethyl, n-propyl, isopropyl, n-butyl, isobutyl, sec-butyl, tert-butyl, pentyl, hexyl, heptyl, octyl, nonyl, isononyl, decyl, and isodecyl.

The following are examples of N-substituted para aminophenol derivatives falling within the invention:

1. $C_2H_5-O-CH_2CH_2NH-\langle\rangle-OH$

2. $C_2H_5-O-CH_2CH_2-O-CH_2CH_2NH-\langle\rangle-OH$

3. $C_4H_9-O-CH_2CH_2NH-\langle\rangle-OH$

4. $C_2H_5-O-CH_2-O-CH_2NH-\langle\rangle-OH$

5. $C_3H_7-O-(CH_2)_3-O-CH_2CH_2NH-\langle\rangle-OH$

6. $C_2H_5-O-\underset{\underset{CH_3}{|}}{C}HCH_2-O-\underset{\underset{CH_3}{|}}{C}HCH_2NH-\langle\rangle-OH$ 7. $C_2H_5-O-CH_2CH_2-O-CH_2CH_2-O-CH_2CH_2-O-CH_2CH_2-O-CH_2CH_2NH-\langle\rangle-OH$ 8. $C_4H_9-O-\underset{\underset{CH_3}{|}}{C}HCH_2-O-\underset{\underset{CH_3}{|}}{C}HCH_2-O-\underset{\underset{CH_3}{|}}{C}HCH_2-O-\underset{\underset{CH_3}{|}}{C}HCH_2-O-\underset{\underset{CH_3}{|}}{C}HCH_2NH-\langle\rangle-OH$ 9. $C_4H_9-O-CH_2CH_2-O-CH_2CH_2-NH-\langle\rangle-OH$ 10. $C_2H_5-O-(CH_2)_3-O-(CH_2)_3-O-(CH_2)_3-NH-\langle\rangle-OH$ These compounds may be prepared in accordance with conventional procedures, which do not form a part of the present invention. To illustrate their preparation by one procedure, the following scheme is presented:

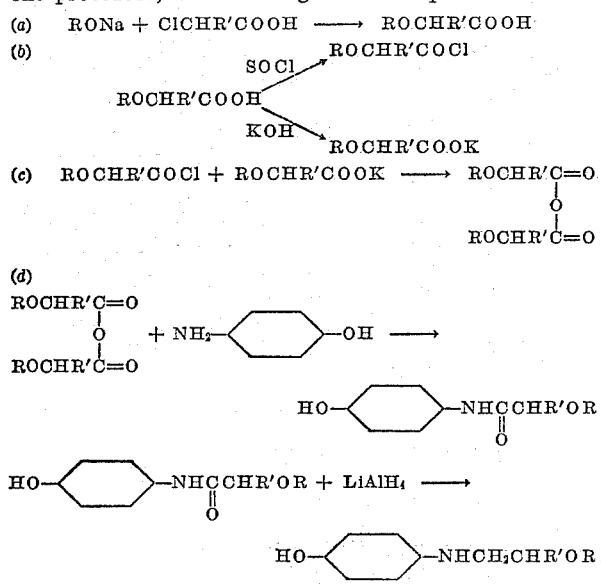

R and R' are alkyl groups, or alternatively R is an alkyl group and R' is hydrogen.

The following example illustrates the preparation of an inhibitor in accordance with the invention.

*Example 1.—Preparation of N-ethoxyethyl-p-aminophenol*

Ethoxy acetic acid (26 g.), prepared from sodium ethoxide and chloroacetic acid, is mixed with 30 g. of thionyl chloride and the solution heated at 40 to 60° C. for at least two hours and allowed to stand at room temperature until evolution of $SO_2$ and HCl ceases. The product is distilled twice through an efficient Vigereaux column. A 56 to 84% yield of ethoxyacetyl chloride is obtained.

To 12.25 g. of freshly distilled ethoxyacetyl chloride is added 14.2 g. of potassium ethoxyacetate (prepared by titrating ethoxyacetic acid with 2 N KOH solution to a phenolphthalein end point evaporating the solution to dryness and powdering the resulting solid). The addition is gradual, with cooling, to control the rapid reaction which follows. After all the solid has been added, the reaction mixture is heated at 100° C. for at least three hours and the resulting mixture distilled in vacuo. About 18 g. (63 to 74% yield) of colorless ethoxyacetic anhydride (boiling point 125–138° C. at 16 mm.) is recovered.

Freshly sublimed p-aminophenol (10 g.) is disposed in 100 cc. of distilled water and the slurry cooled to 10° C. Nineteen g. of ethoxyacetic anhydride is added quickly and the solution stirred. The aminophenol dissolves and the anilide precipitates almost at once. The mixture is held at 40° F. overnight and the solid filtered with suction and dried in a dessicator over sulfuric acid in a nitrogen atmosphere. A yield of 60 to 70% of the solid p-hydroxy-N-ethoxyacetanilide, which melts at 88 to 89° C., is obtained.

To a flask containing 150 cc. of freshly fractionated tetrahydrofuran (dried over sodium hydroxide) and fitted with a water condenser and a hopper is added 22.0 g. of anhydrous aluminum chloride in small portions. This solution is then transferred to a dropping funnel.

One hundred cc. of freshly fractionated dried tetrahydrofuran is placed in a one liter, three necked flask fitted with a mercury-seal stirrer and a dry-ice-acetone cold finger condenser. One gram of commercial lithium aluminum hydride is added and the slurry refluxed for two hours until the lithium aluminum hydride has dissolved. It is then cooled and 5.8 grams of lithium hydride added. The dropping funnel containing the aluminum chloride solution is then fitted to the flask and the solution added slowly at a rate to just maintain refluxing. The gray-green slurry which results is allowed to stand overnight with a drying tube containing drierite and ascarite attached to the condenser outlet.

The slurry is then cooled to 20–25° C. and 12 grams of p-hydroxy-N-ethoxyacetanilide added gradually with stirring over 30 minutes while the temperature is maintained between 20 and 25° C. The mixture is then stirred 20 minutes longer at the same temperature, after which the temperature is raised to between 63 and 66° C. for 10 to 15 minutes, cooled to room temperature and allowed to stand for 2 to 3 hours.

Water is added dropwise with care to decompose any excess lithium aluminum hydride or lithium hydride. This decomposition is violent and considerable gas and heat are liberated. When no further reaction is evident, 400 cc. of a 20% potassium sodium tartrate solution is added. Two liquid layers and a solid layer result. Subsequent operations must be carried out under nitrogen since the product, N-ethoxyethyl-p-aminophenol, is very sensitive to oxidation.

The water layer is separated in a separatory funnel and filtered to remove suspended solid. The filtrate is steam distilled to remove dissolved tetrahydrofuran. The residue is brought to a pH of 7.5 by addition of 6 N hydrochloric acid, after which it is extracted with six 100 cc. portions of chloroform to remove the N-ethoxyethyl-p-aminophenol. The chloroform is removed by distillation under vacuum and the phenol, a dark red-brown viscous oil, recovered in 52% yield from the residue, which also contains 10% unreacted p-hydroxy-N-ethoxy acetanilide.

Following the above general procedure, any of the inhibitors in accordance with the invention may be prepared, using appropriate intermediates, as will be evident to those skilled in the art.

THE FUELS OF THE INVENTION

In practice one or a mixture of two or more compounds in accordance with the invention are blended into the fuel at the refinery. Since the compounds are liquids and quite soluble in hydrocarbon fuels derived from petroleum, incorporation is easily accomplished by simply stirring the compound, usually in an amount between 0.001% and 0.10% and preferably 0.001 to 0.01% by weight, into the fuel blend. In general, depending upon the grade of gasoline, it is desirable to employ proportions within the following ranges:

REGULAR GRADE GASOLINE BLENDS

| | |
|---|---|
| Mixed catalytically and thermally cracked petroleum distillate of gasoline grade | 60 to 75% by volume. |
| Straight run gasoline | 25 to 40% by volume. |
| Tetraethyl lead | 0.5 to 3.0 cc. per gallon. |
| Inhibitor | 0.001 to 0.1% by weight. |

Butane in sufficient amount to obtain a Reid vapor pressure of 8 to 15 pounds per square inch, depending on the season of the year.

PREMIUM GRADE GASOLINE BLENDS

| | |
|---|---|
| Mixed catalytically and thermally cracked petroleum distillate | 75 to 90% by volume. |
| Straight run gasoline | 5 to 20% by volume. |
| Catalytic polymer gasoline | 3 to 10% by volume. |
| Tetraethyl lead | 0.5 to 3.0 cc. per gallon. |
| Inhibitor | 0.001 to 0.1% by weight. |

Butane in sufficient amount to obtain a Reid vapor pressure of 8 to 15 pounds per square inch, depending on the season of the year.

Fuels in accordance with the invention are characterized by improved stability to oxygen, remaining practically unchanged even after four weeks' storage in air at fairly high summer temperatures. Because of their improved stability, gum formation from "potential" gum is inhibited. In addition, deposition of the "preformed" gum contained in the fuel is minimized. The latter effect is enhanced by those compounds of the invention having longer polyether chains, and is greatest in those compounds having three or more ether linkages affixed to the amino nitrogen, such as, for example, compounds Nos. 7, 8 and 10.

The following examples illustrate motor fuels designed for use in internal combustion engines and embodying oxidation and gum deposition inhibitors of the invention.

*Example 2.—Thermally cracked gasoline fuel having an F–1 octane rating of 84.0*

Four gasoline blends were prepared composed of thermally cracked petroleum distillate and containing 0.005% by weight inhibitor. In Blends Nos. 2 to 4 the inhibitors were all compounds of the prior art, and, in Blend No. 5, the inhibitor was a compound of the invention.

As a measure of the effectiveness of these compounds as oxidation inhibitors four gallons of each of the fuels were stored in 5-gallon tightly closed cans and samples taken at intervals of one and four weeks to determine the rate of preformed gum formation. Storage temperatures were in the range of 80 to 90° F. The induction period in each case was determined by the ASTM test, Designation D525–46. Tests were made to determine the amount of preformed gum by deposition in accordance with the ASTM test, Designation D381–46. The results were as follows:

| Fuel Blend | Inhibitor | ASTM Induction Period, Hours | ASTM Gum, mgms./100 ml. | | |
|---|---|---|---|---|---|
| | | | Initial | After 1 week | After 4 weeks |
| 1 | | ¼ | 34.4 | 89.4 | 73.6 |
| 2 | N,N'-di-sec-butyl-p-phenylenediamine. | 2¼ | 3.6 | 10.0 | 16.0 |
| 3 | N-n-butyl-p-aminophenol. | 2 | 9.0 | 17.6 | 17.6 |
| 4 | 2,6 di-tert-butyl-4-methylphenol. | ¾ | 3.6 | 39.6 | 25.8 |
| 5 | N-ethoxyethyl-p-aminophenol. | 4½ | 0.6 | 3.6 | 2.6 |

Both the induction period and the amount of preformed gum show the inhibitor of the invention to be more effective in preventing oxidation than the other inhibitors tested.

As a measure of the effectiveness of the compounds both as antioxidants and gum deposition inhibitors the induction manifold deposit was measured by the glass manifold test. This test is conducted using the CFR single-cylinder engine. A glass tube 43 cm. in length and 2 cm. in diameter is inserted in a horizontal position between the standard air intake-carburetor assembly and the cylinder. A length of Nichrome wire of 10 ohms resistance is coiled, and eight turns of the coil are wound around the glass tube. The first turn is 12 cm. from the carburetor and the eight turns extend over a length of 8 cm. of the tubing. A thermocouple is taped to the tube ½ inch beyond the last coil. This coil provides a hot-spot in the induction system. The engine is then operated under the following conditions:

| | |
|---|---|
| Load | None |
| Speed, R. P. M | 600 |
| Coolant Temp., ° F | 210 |
| Oil Temp., ° F | 150 |
| Air temp., intake, ° F | 95±5 |
| Air/fuel ratio (weight) | 12.5±0.5 |
| Time of test, hrs | 10 |
| Fuel consumption, gal./hr | 0.19 |

The Nichrome "hot spot" is heated and controlled by a Variac so that the thermocouple ½ inch beyond the wire indicates a temperature of 170°±5° F. The amount of deposit in the glass tube is measured after each test. A fresh tube is used for each test.

The fuels which had been in storage four weeks were subjected to the glass manifold test. The results are shown in the following table:

| Fuel Blend | Gum Content of Fuel at time of Test (mgms./100 ml.) | Glass Manifold Deposit Weight (grams) |
|---|---|---|
| 1 | 70 | 1.1169 |
| 2 | 8.9 | 0.3579 |
| 3 | 16.4 | 0.5932 |
| 4 | 25.8 | 1.0268 |
| 5 | 4.7 | 0.1562 |

This test shows that a fuel containing the inhibitor of the invention (No. 5) is more stable to oxidation and has a much lower tendency to form induction system deposits than fuels containing the other inhibitors tested.

No deposits were noted in the power section of the CFR engine.

*Example 3.—Regular grade gasoline fuel having an F-1 octane rating of 84.0*

Four fuels were prepared containing 68.7% by volume mixed catalytically and thermally cracked gasoline, 31.3% by volume straight run gasoline and 0.005% by weight inhibitor. The inhibitors in Blends Nos. 2 to 4 were all compounds of the prior art, and, in Blend No. 5, the inhibitor was a compound of the invention.

As a test of the effectiveness of the inhibitors as antioxidants, the induction period of these fuels was determined in accordance with ASTM test, Designation D525-46 and the amount of preformed gum present before and after storage in four gallon quantities in 5-gallon tightly closed metal cans determined in accordance with ASTM test, Designation D381-46. Storage temperatures were between 80 and 90° F. The results were as follows:

| Fuel Blend | Inhibitor | ASTM Induction Period, Hours | ASTM Gum, mgms./100 ml. | | |
|---|---|---|---|---|---|
| | | | Initial | After 1 week | After 4 weeks |
| 1 | | 2½ | 4.0 | 8.2 | 14.6 |
| 2 | N,N'-di-sec-butyl-p-phenylenediamine | 7¾ | 7.6 | 8.2 | 8.2 |
| 3 | N-n-butyl-p-aminophenol | 7½ | 2.6 | 6.6 | 8.4 |
| 4 | 2,6 di-tert-butyl-4-methylphenol | 3 | 3.8 | 6.4 | 8.4 |
| 5 | N-ethoxyethyl-p-aminophenol | 9 | 0.8 | 6.2 | 5.4 |

The effectiveness of the inhibitors in preventing induction manifold deposits was measured, using 4 and 6 week old samples, by the glass manifold test described in Example 2, with the following results:

| Fuel Blend | Gum Content of Fuel at time of Test (mgms./100 ml.) | Glass Manifold Deposit Weight (grams) |
|---|---|---|
| 1 | 15.3 | 0.7041 |
| 2 | 8.3 | 0.2494 |
| | ¹12.8 | 0.3568 |
| 3 | 7.6 | 0.1538 |
| | 8.6 | 0.2375 |
| 4 | ¹9.2 | 0.3285 |
| | 5.5 | 0.1376 |
| 5 | ¹7.1 | 0.1475 |

¹ 6-week samples. All others after 4 weeks.

These tests show that a fuel containing the inhibitor in accordance with the invention is more stable to oxidation and had less tendency to form induction system deposits than those with the other inhibitors tested.

No deposits were noted in the power section of the CFR engine.

The gum present in gasoline may be thought of as consisting of two types, "preformed" or actual gum, composed of nonvolatile organic material, and "potential" gum, composed of oxidizable unsaturated hydrocarbons initially volatile but which, during the execution of a test or in storage, change in character and become nonvolatile, i. e., preformed gum. It is generally agreed that only the preformed gum will deposit in the induction system of a motor. The potential gum is of little significance with reference to the motor use of the gasoline at the time of the test, although its rate of conversion to preformed gum indicates to some degree the stability of the gasoline in storage. Thus the term "gum" is used throughout this specification and claims to refer to preformed gum. It will be evident from the above discussion that, in terms of this definition, the inhibitors of the invention tend to prevent conversion of potential gum into preformed gum, and also to prevent deposition of preformed gum in the induction system and power section of the engine. In each of these functions they are more effective than the prior aminophenol and phenylenediamine derivatives sugggested for use in gasoline fuels.

This application is a continuation-in-part of our copending application Serial No. 189,888, filed October 12, 1950, and now abandoned.

We claim:

1. An N-alkyleneoxyalkyl aminophenol having the general formula:

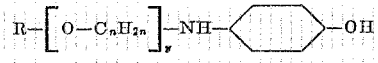

where R is an alkyl radical having from one to about ten carbon atoms, n is a small whole number from one to about three, and y is a small whole number from one to about five.

2. An N-ethyleneoxyethyl p-aminophenol having the general formula:

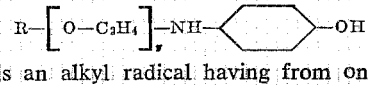

where R is an alkyl radical having from one to about ten carbon atoms, and y is a small whole number from one to about five.

3. A fuel for internal combustion engines comprising a gum-forming gasoline as the major component and a small amount sufficient to inhibit gum formation of a compound having the general formula:

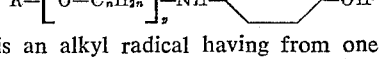

where R is an alkyl radical having from one to about ten carbon atoms, n is a small whole number from one to about three and y is a small whole number from one to about five.

4. A fuel for internal combustion engines comprising a gum-forming gasoline as the major component and a small amount sufficient to inhibit gum formation of a compound having the general formula:

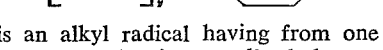

where R is an alkyl radical having from one to about ten carbon atoms and y is a small whole number from one to about five.

5. A fuel comprising cracked petroleum distillate as the major component, tetraethyl lead, butane and a small amount sufficient to inhibit gum formation of a compound having the general formula:

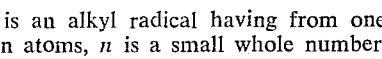

where R is an alkyl radical having from one to about ten carbon atoms, n is a small whole number from one to about three and y is a small whole number from one to about five.

6. A fuel comprising cracked petroleum distillate as the major component, tetraethyl lead, butane and a small amount sufficient to inhibit gum formation of a compound having the general formula:

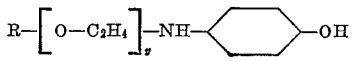

where R is an alkyl radical having from one to about ten carbon atoms and $y$ is a small whole number from one to about five.

7. A fuel comprising cracked petroleum distillate and straight run gasoline as the major components, tetraethyl lead, butane in an amount to obtain a Reid vapor pressure of 8 to 15 pounds per square inch and between about 0.001 and about 0.1% by weight of a compound having the general formula:

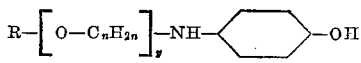

where R is an alkyl radical having from one to about ten carbon atoms, $n$ is a small whole number from one to about three and $y$ is a small whole number from one to about five.

8. A fuel comprising cracked petroleum distillate and straight run gasoline as the major components, tetraethyl lead, butane in an amount to obtain a Reid vapor pressure of 8 to 15 pounds per square inch and between about 0.001 and about 0.1% by weight of a compound having the general formula:

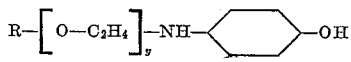

where R is an alkyl radical having from one to about ten carbon atoms and $y$ is a small whole number from one to about five.

9. A fuel comprising cracked petroleum distillate, straight run gasoline and catalytic polymer gasoline as the major components, tetraethyl lead, butane in an amount to obtain a Reid vapor pressure of 8 to 15 pounds per square inch and from 0.001 to 0.1% by weight of a compound having the general formula:

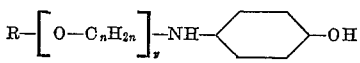

where R is an alkyl radical having from one to about ten carbon atoms, $n$ is a small whole number from one to about three and $y$ is a small whole number from one to about five.

10. A fuel comprising cracked petroleum distillate, straight run gasoline and catalytic polymer gasoline as the major components, tetraethyl lead, butane in an amount to obtain Reid vapor pressure of 8 to 15 pounds per square inch and from 0.001 to 0.1% by weight of a compound having the general formula:

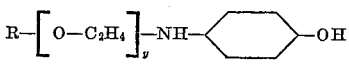

where R is an alkyl radical having from one to about ten carbon atoms and $y$ is a small whole number from one to about five.

References Cited in the file of this patent

UNITED STATES PATENTS

| | | |
|---|---|---|
| 2,045,323 | Felix et al. | June 23, 1936 |
| 2,241,247 | Dickey | May 6, 1941 |
| 2,576,458 | Hill et al. | Nov. 27, 1951 |
| 2,618,657 | Vaughn et al. | Nov. 18, 1952 |